No. 772,270. PATENTED OCT. 11, 1904.
H. BECKWITH.
SELF PROPELLED VEHICLE.
APPLICATION FILED MAR. 24, 1904.
NO MODEL. 2 SHEETS—SHEET 2.

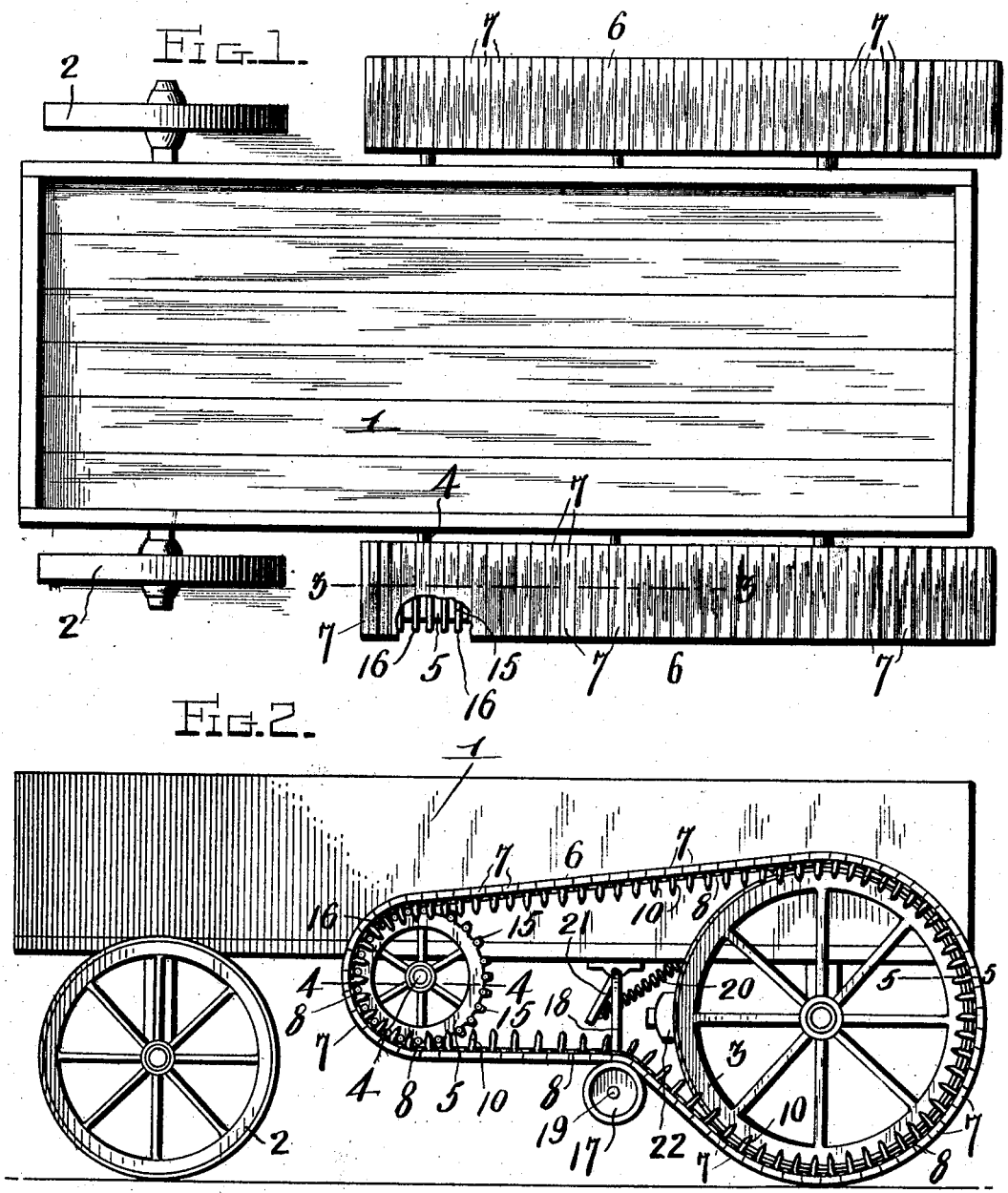

Witnesses
Jas A. Kaehl
[signature]

Inventor
Harvey Beckwith,
By [signature]
Attorney

No. 772,270. Patented October 11, 1904.

UNITED STATES PATENT OFFICE.

HARVEY BECKWITH, OF OAKLAND, CALIFORNIA.

SELF-PROPELLED VEHICLE.

SPECIFICATION forming part of Letters Patent No. 772,270, dated October 11, 1904.

Application filed March 24, 1904. Serial No. 199,845. (No model.)

*To all whom it may concern:*

Be it known that I, HARVEY BECKWITH, a citizen of the United States, residing at Oakland, in the county of Alameda and State of California, have invented certain new and useful Improvements in Self-Propelled Vehicles; and I do declare the following to be a full, clear, and exact description of the invention, such as will enable others skilled in the art to which it appertains to make and use the same.

My invention relates to improvements in traction-trucks or self-propelled vehicles adapted for carrying heavy loads on muddy, sandy, or rough roads.

The object of my invention is to improve and simplify the construction and operation of machines of this character, and thereby render them more efficient and durable in use and less expensive to manufacture.

With this and other objects in view the invention consists of certain novel features of construction, combination, and arrangement of parts, as will be more fully described, and particularly pointed out in the appended claims.

Figure 3:
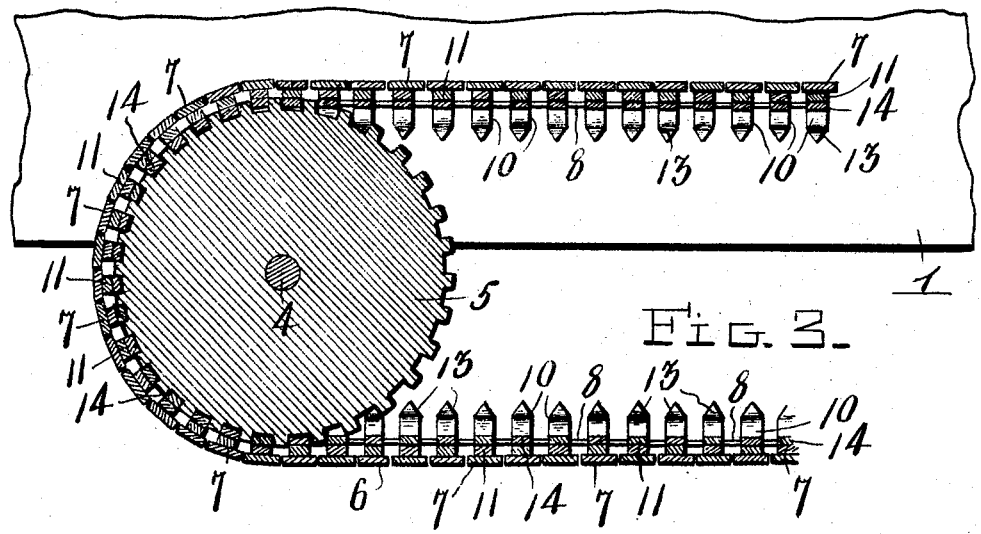
Figure 4:
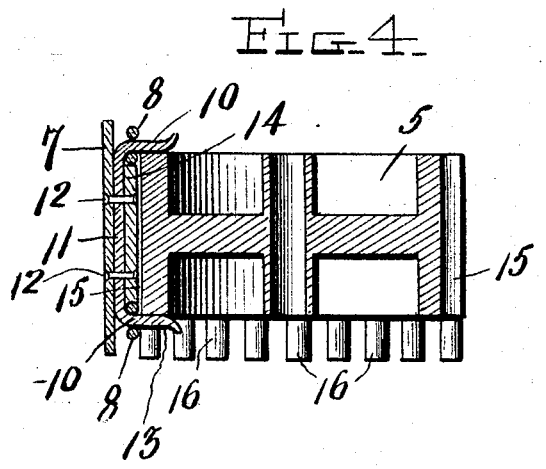
Figure 5:
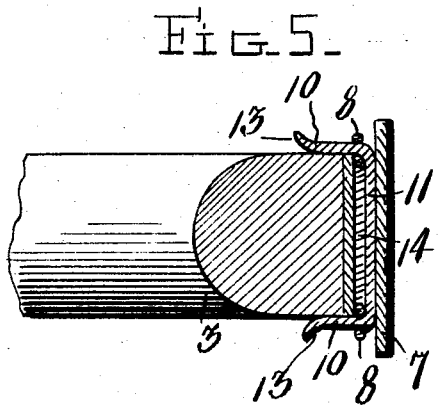
Figure 6:
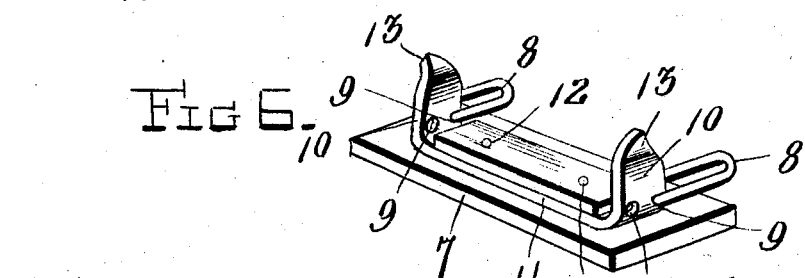

In the accompanying drawings, Figure 1 is a top plan view, with parts in section, of a truck or vehicle embodying my invention. Fig. 2 is a side elevation of the same. Fig. 3 is a vertical longitudinal section taken on the line 3 3 of Fig. 1. Fig. 4 is a detail horizontal sectional view taken on the line 4 4 of Fig. 2. Fig. 5 is a detail horizontal sectional view taken on the line 5 5 of Fig. 2. Fig. 6 is a perspective view of one of the sections of the endless belt.

Referring to the drawings by numerals, 1 denotes the frame of a truck or vehicle of any description supported in any suitable manner by front steering-wheels 2 and rear drive or traction wheels 3. Journaled in suitable bearings on said frame is a transverse counter-shaft 4, which may be driven by a motor (not shown) of any desired character suitably mounted upon the vehicle. Secured upon each end of said shaft in line with the upper portions of the supporting drive-wheels 3 is a power-transmission wheel 5 of peculiar construction, as presently explained, and passed about said wheel 5 and said wheel 3 on each side of the frame is a flexible endless belt 6, which serves both as a driving means and a movable supporting track-rail for the said supporting drive-wheel 5. Each of the said belts 6 comprises a plurality of slats 7, preferably of rectangular form, loosely connected edgewise by elongated rings or links 8, so as to render the belt sufficiently flexible and at the same time have as smooth and unbroken an outer surface as possible. These links 8, two of which are used to connect each two adjacent slats, pass through openings 9 formed in the right-angularly bent ends or arms 10 of U-shaped plates 11, secured upon the inner faces of the slats 7 by rivets, bolts, or the like 12. The said plates 11 are slightly greater in length than the width of the periphery or rim of the wheels 3 and 5, which periphery or rim runs between its bent ends or arms 10, as shown, and in order to guide said belt and wheels into engagement with each other said ends or arms have their outer portions bent or curved outwardly, as at 13. Secured by the said rivets 12 upon said plates 11, between its bent ends or arms 10, are blocks or plates 14 of less width than the slats 7, so that they form spaced projections upon the inner face of the belt and permit the latter to act as a sprocket-chain to coact with the power-transmission wheel 5, which is in the form of a sprocket wheel or gear, as clearly shown in Fig. 3. Each of the said wheels 5 has its periphery formed with projections or teeth 15, adapted to enter the spaces between the blocks 14 on two adjacent slats 7 of the endless belts and spaces between said teeth 15, in which said blocks 14 are adapted to work. By this construction the motion of the wheels 5 will be imparted to the belts 6, and to overcome all liability of loss of power due to the slipping of the belt upon the wheel I provide the side edges of the periphery or rim of said wheel with spaced projections or teeth 16, which are adapted to enter between the bent ends or arms 10 of the U-shaped plates 11, as shown, said ends 10 being also slightly tapered or pointed to permit them to more readily enter between the teeth 16.

In order to take up any slack in the belts 6 and to hold them taut, as shown, I provide idler-wheels 17, which engage the under sides of the lower stretches or runs of the belts between the wheels 3 and 5. Said idlers 17 are journaled upon the crank ends 18 of a transverse shaft 19, mounted to oscillate in bearings upon the frame 1 and are held in engagement with said belts by the tension of a coil-spring 20, which has one of its ends attached to the frame 1 and its opposite end attached to an arm 21, secured to said shaft 19. Any desired means may be provided for varying the tension of said spring, and hence the tension of said idlers upon the belts.

The operation and advantages of my invention will be readily understood from the foregoing description, taken in connection with the accompanying drawings. It will be seen that when the shaft 4 is rotated its motion will be communicated by the sprocket-wheels 5 and belts or chains 6 to the drive-wheels 3, which will run upon the said belts and move the vehicle or truck forwardly or rearwardly, according to the direction of rotation of the shaft 4.

It will be observed that a vehicle of ordinary construction may be readily converted into a self-propelled vehicle by mounting a suitable motor upon the same and providing the counter-shaft 4, gears 5, belts 6, and idlers 17, as shown. No part of an ordinary vehicle need be altered, and since the wheels 3 are not changed the ordinary brakes 22 may still be used.

It will be understood that the belts 6 may be made of any desired width according to the ground upon which the vehicle is to be used, and, if desired, the outer faces of the belt may be faced with rubber or provided with spurs or the like.

While I have shown and described the preferred embodiment of my invention, it will be understood that I do not limit myself to the precise construction herein set forth, since various changes in the form, proportion, and the minor details of construction may be resorted to without departing from the principle or sacrificing any of the advantages of this invention.

Having thus described my invention, what I claim as new, and desire to secure by Letters Patent, is—

1. The combination with a vehicle having a supporting drive-wheel, of a power-shaft, a sprocket wheel or gear upon said shaft provided with teeth or projections upon its periphery and its sides, and a flexible endless belt passed about said sprocket-wheel and said supporting drive-wheel, said belt comprising loosely-connected slats having projections to enter the spaces between the teeth on the periphery of said sprocket-wheel and projections to both guide said belt and wheels into engagement with each other and enter the spaces between the teeth upon the sides of said sprocket-wheel, substantially as described.

2. The combination with a vehicle having a supporting drive-wheel, of a power-shaft, a sprocket wheel or gear upon said shaft provided with teeth or projections upon its periphery and its sides, a flexible endless belt passed about said sprocket-wheel and said supporting drive-wheel to act as both a drive-belt and a moving track for said supporting drive-wheel, and means upon said belt for engaging the teeth upon said sprocket-wheel and guiding said wheels and said belt into engagement with each other, substantially as described.

3. The combination with a vehicle having a supporting drive-wheel, of a power-shaft, a sprocket wheel or gear upon said shaft provided with teeth or projections upon its periphery and its sides, and a flexible endless belt passed about said sprocket-wheel and said supporting drive-wheel, said belt comprising a plurality of slats, U-shaped plates upon said slats, blocks upon said plates, and links loosely connecting the arms of said U-shaped plates upon adjacent slats, the said blocks being adapted to enter the spaces between the teeth upon the periphery of said sprocket-wheel and the arms of said U-shaped plates being adapted to engage the side edges of the rims of said wheels and to enter the spaces between the teeth upon the sides of said sprocket-wheel, substantially as described.

4. The combination with a vehicle having supporting drive-wheels, of a transverse power-shaft, sprocket-wheels upon said shaft provided with teeth or projections upon their peripheries and upon their sides, and flexible endless belts passed about said sprocket-wheels and said supporting drive-wheels, each of said belts comprising a plurality of slats, U-shaped plates upon said slats, blocks upon said plates, and links loosely connecting the arms of said U-shaped plates upon adjacent slats, the said blocks being adapted to engage the spaces between the teeth upon the peripheries of said sprocket-wheels and the arms of said U-shaped plates being adapted to engage the side edges of the rims or peripheries of said wheels and to enter the spaces between the teeth upon the sides of said sprocket-wheels, substantially as described.

5. A combined endless track and drive-belt for vehicles, comprising slats, U-shaped plates, blocks, fastening means securing said blocks between the arms of said U-shaped plates and said plates upon the inner faces of said slats, and links loosely connecting the arms of said U-shaped plates upon adjacent slats, substantially as described.

6. A combined endless track and drive-belt for vehicles, comprising slats, U-shaped plates, blocks, fastening means securing said blocks between the arms of said U-shaped plates and said plates upon the inner faces of said slats, and links loosely connecting the arms of said U-shaped plates upon adjacent slats, in combination with a power sprocket-wheel having teeth or projections upon its periphery and its sides, said teeth upon its periphery being adapted to enter the spaces between said blocks upon adjacent slats and said teeth upon its sides being adapted to enter the spaces between the arms of said U-shaped plates upon adjacent slats, substantially as described.

7. The combination with a vehicle having a supporting drive-wheel, a power-wheel, a combined flexible endless track and drive-belt surrounding said power and drive wheels, and a spring-actuated idler-wheel adapted to take upon the slack in said belt, substantially as described.

8. The combination with a vehicle having supporting drive-wheels, a transverse power-shaft, power-transmission wheels upon said shaft, combined flexible endless track and drive-belts connecting said power-transmission wheels and said supporting drive-wheels, a transverse oscillatory shaft having crank ends, idler-wheels journaled upon said ends and engaging said belts, and a spring for actuating said shaft and causing said idler-wheels to take up the slack in said belts, substantially as described.

In testimony whereof I have hereunto set my hand in presence of two subscribing witnesses.

HARVEY BECKWITH.

Witnesses:
PHILIP M. WALSH,
M. F. WALSH